July 31, 1951 G. A. TINNERMAN 2,562,343
SPRING FASTENING DEVICE
Filed Feb. 7, 1949
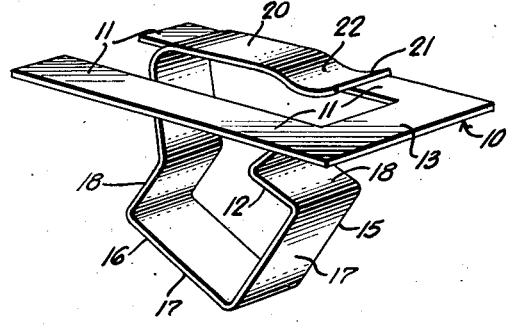
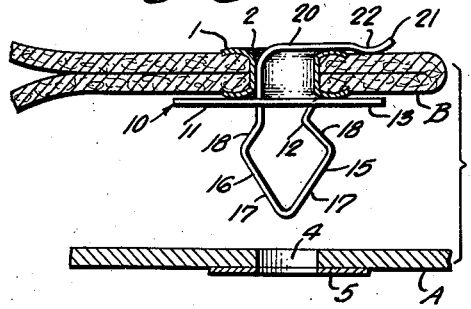
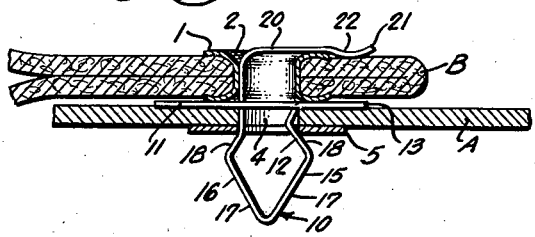
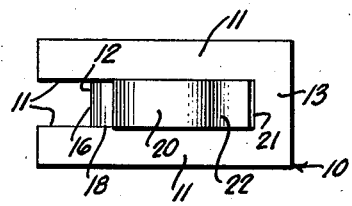
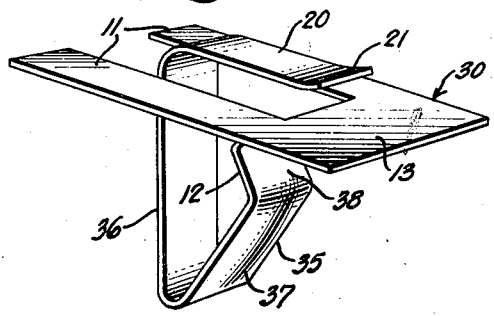
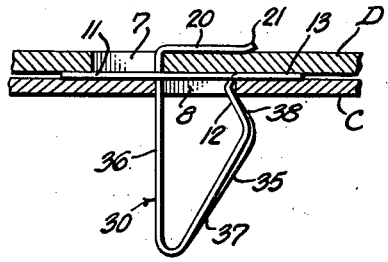
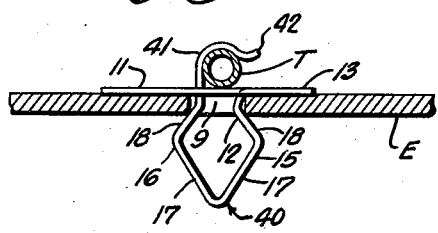
Inventor
GEORGE A. TINNERMAN
By
H. G. Lombard
ATTORNEY Patented July 31, 1951

2,562,343

UNITED STATES PATENT OFFICE 2,562,343

SPRING FASTENING DEVICE

George A. Tinnerman, Cleveland, Ohio, assignor to Tinnerman Products, Inc., Cleveland, Ohio, a corporation of Ohio Application February 7, 1949, Serial No. 74,901

1 Claim. (Cl. 24—81)

This invention relates in general to snap fasteners and deals, more particularly, with an improved spring fastening device which is provided in a simplified one-piece construction for securing two or more parts in an installation.

A general type of snap stud fastener which is widely used is provided in the manner of a fastener body or base that defines the head of the fastener and the snap stud shank formed from a strip projecting from said head with the free end of the strip unsupported relative to the head. In many assemblies, such fasteners have been found ineffective and inefficient due to the fact that the free end of the strip forming the fastener shank is necessarily subject to spreading apart and separating from the head of the fastener under ordinary tensile loads and axial forces which develop in the use of the installation with the result that the secured parts are not tightly fastened in the manner intended, and the fasteners frequently work loose and often become completely removed from effective fastening position.

The fasteners in accordance with this invention embody an improved construction in which the free end of the strip defining the snap stud shank is so formed as to provide a clip element or the like for attaching or securing a cooperating part or object in an assembly, and in this relation, such free end of the strip is firmly and rigidly supported in the applied fastening position of the fastener in a manner which develops greatly increased strength in the stud of the fastener and otherwise adds to the effectiveness of the complete securing action of the fastener.

A primary object of the invention, therefore, is to provide a fastener and fastening installation of the kind described wherein the fastener is formed in a simplified one-piece construction comprising a head and an integral strip which is bent to provide a snap stud for fastening in a stud opening in a supporting part together with a clip element formed from the free end of said strip for securing an object or part to said supporting part in a manner whereby said clip element adds to and increases the strength and durability of the snap stud in applied fastening position.

Another object of the invention is to provide a fastener and fastening installation of this character in which the stud of the fastener in applied position is rigidly supported throughout relative to the head of the fastener and is thereby adapted to withstand both axial and lateral forces to which the stud may be subjected in the use of the installation.

A further object of the invention is to provide an improved one-piece fastener such as described which comprises a highly simplified construction of a snap stud for fastening in a stud opening in a supporting part and a combined clip element or attaching means formed from an extension of the snap stud for attaching the fastener in self-retained position on a part or object to be secured to the supporting part.

Another object of the invention is to provide an improved spring fastener having all the foregoing features and characteristics and which is particularly suited for economical quantity production at relatively low cost.

Further objects and advantages and other new and useful features in the construction and arrangement of the invention will be readily apparent as the following description proceeds with reference to the accompanying drawings, for purposes of illustration but not of limitation, in which like reference characters designate like parts throughout, and in which:

Fig. 1 is a perspective view illustrating one form of the improved clip or fastener of the invention;

Fig. 2 is a sectional view of an assembly of parts to be secured showing the fastener of Fig. 1 as attached to one of such parts and in position to be applied to fastening engagement in a stud opening in a cooperating part;

Fig. 3 is a top plan view of the fastener per se shown in Figs. 1 and 2; and,

Fig. 4 is a sectional view showing the parts of Fig. 2 as secured together in the applied fastening position of the fastener.

Fig. 5 is a perspective view of another form of the improved fastener; and,

Fig. 6 is a sectional view of a fastening installation secured by the fastener illustrated in Fig. 5.

Fig. 7 is a sectional view illustrating a further form of the fastener as provided for securing a rod, tube, cable or similar object in an installation.

Referring now more particularly to the drawings, Fig. 1 shows one form of the improved fastener of the invention and Fig. 2 the manner in which it is attached in self sustained position on the part B to be secured to part A. In the present example, the part A illustrates a flange portion of a plate of any suitable metal, wood, plastic or fibre board material serving as a baffle plate which is secured to the part B representing a plate-like flange of a structure made of fabric or the like. The part B is shown provided as a double layer of such fabric or other material for added strength and rigidity and the same secured by a series of grommets 1 along the path which the part A extends in attached position thereto. Such a grommet 1 defines an opening 2 for attaching a fastener therein in self sustained position as shown in Fig. 2; likewise, in any similar assembly the part B may be of any suitable metal, wood or plastic material and provided with a simple opening for attaching the fastener thereto in the same general manner. The part A is provided with a fastener receiving opening 4 for receiving the snap stud of the fastener and such opening is shown reinforced by a washer 5 adapted for snap fastening engagement with the snap stud. In other assemblies in which said part is made of rigid material, the washer 5 may be omitted and the snap stud secured entirely in the opening 4 in an equally effective manner.

The improved spring fastener designated generally 10 in Fig. 1, is a simple inexpensive article of manufacture which is readily constructed from any suitable sheet metal material preferably spring metal such as spring steel or cold rolled steel having spring-like characteristics. The fasteners may be formed from blanks of various outlines of course, but from the standpoint of economical quantity production, are most advantageously provided from relatively small, generally rectangular blanks provided from standard sheet metal strip stock with little loss or waste of material.

The sheet metal blank is slit longitudinally with a pair of spaced parallel slits defining a pair of spaced head sections 11 on either side of a central strip 12 which is joined to said head sections by an integral central head section 13 at one end of the blank. The central strip 12 extends lengthwise between the spaced head sections 11 and is bent into a generally V-shaped snap stud projecting from the head of the fastener defined by said spaced head sections 11. The inner end of the strip is integral with the central head section 13 and defines a relatively rigid arm 15 extending from the fastener body for the desired length of shank as determined by a return bend providing a cooperating spring arm 16. The arms 15, 16, defining the stud of the fastener are substantially similar and comprise inclined guide surfaces 17 diverging outwardly from the leading end of the stud and merging into inwardly extending cam shoulders 18 adapted for snap fastening engagement in the opening 4 in part A.

The free end of the strip forming the spring arm 16 extends upwardly between the spaced head sections 11 to the side opposite that at which the snap stud is provided and said free end is bent generally normal to spring arm 16 into a tongue or hook 20 which is spaced from head sections 11, 13 of the fastener a distance slightly less than the thickness of the part B. The tongue or hook 20 accordingly is adapted to cooperate with said head sections in the manner of a clip element in clasping engagement with said part B to hold the fastener in attached position thereon as shown in Fig. 2. Preferably the extremity of said hook is provided with an outwardly flared lip 21 for facilitating this attachment and an adjacent inwardly bent depression 22 for retaining the clip in such attached position.

The fastener 10 as thus provided is easily and quickly attached to the part B through the opening 2 defined by the grommet 1 simply by canting the fastener as necessary to pass the tongue or hook 20 through said opening to a position in which said tongue 20 clasps the outer side of part B in cooperation with the head sections 11 in engagement with the underside of said part B. The outwardly flared lip 21 on the extremity of said tongue 20 facilitates the initial application thereof through the grommet opening 2 into such clasping engagement with part B, and inasmuch as said tongue is resiliently disposed on the spring arm 16, it is adapted to yield outwardly as necessary to accommodate varying thicknesses of said part B.

The fastener as thus attached to part B has only the relatively narrow strip portion of the tongue or hook 20 disposed in the opening 2 in part B and accordingly, the fastener is adjustable in said opening in what may be termed a floating attachment. This permits the fastener to be readily shifted if necessary to compensate for any misalignment of the openings 2 and 4 in order to register the snap stud with the stud opening 4 preparatory to the application of the snap stud to final position in the completed assembly shown in Fig. 4.

From the foregoing, it will be understood that in the procedure for securing the part A to part B, or vice-versa, as many spring fasteners 10 as are necessary are attached in the openings 2 of the grommets 1 or other openings provided in the part B in a spaced relation corresponding to the spacing of the stud openings 4 in part A along the path which said part A extends in secured position. In the securing operation, the projecting stud of each fastener defined by the cooperating arms 15, 16, is readily entered into the associated opening 4 in part A inasmuch as said spring arms at the leading end of the stud have a smaller spacing than the size of said opening. Upon suitable axial force on the fastener provided by pressure either on part B or part A, said arms 15, 16 are moved axially into the opening 4 whereupon the inclined guide surfaces 17 cam against the marginal edges of said opening to cause a gradual contraction of said arms 15, 16, as necessary for the cam shoulders 18 thereon to pass through the opening and ride on the lower corner edge of said opening at the reverse side of said part to the point of most effective fastening engagement. In the present example, a washer 5 is employed to reinforce the marginal portion of the opening 4 and accordingly, such cam shoulders 18 have a similar fastening engagement with the lower corner edges of the opening in said washer 5. Preferably the shoulders 18 are provided in the manner of cam surfaces which adapt the fastener for effective application to openings in parts of different thicknesses, within limits, and otherwise provide a suitable axial drawing action on the fastener shank to secure the parts A, B, tightly together in final position.

In any case, in the attached position of the fastener, the hook or tongue 20 bears upon said part B and thereby rigidifies and supports the free end portion of the strip 12 in a manner whereby the spring arm 16 formed from such free end portion has substantially the same strength and rigidity in relation to the head of the fastener as the arm 15 which is integral with the head of the fastener.

The arrangement is such that the tongue or hook 20 is disposed in overlapping bearing engagement with the part B and is thereby interconnected therewith in a manner which prevents any movement of the spring arm 16 in an axial direction towards spreading apart or separation from the head of the fastener. Thus the free end of the spring arm 16 is fixedly retained by the tongue or hook 20 to strengthen and reinforce said spring arm in its securing action in a manner which resists any axial force which might tend to cause a separation of said spring arm from its most effective fastening position in the stud opening 4 in part A. At the same time, that portion of the spring arm 16 which extends between the spaced head sections 11 has its side edges in positive abutting relation with the inner edges of said spaced head sections, as shown in Fig. 3, to resist any lateral force which might tend to distort the spring arm 16 laterally from its proper position in opposing relation to the dependent arm 15. Accordingly, this construction of the spring arm 16 to extend between the spaced head sections 11 together with the function of the hook or tongue 20 in attached position, as aforesaid, serves to anchor the free end of said spring arm 16 against both axial and lateral distortion, thereby providing for maximum strength of the stud in fastening position in the stud opening 4.

Figs. 5 and 6 disclose another form of fastener 30 which has the same general construction and use as that of Figs. 1-4 inclusive but in which the snap stud portion is so formed as to provide a more pronounced locking action in the associated stud opening. The fastener comprises a similar type of head defined by the spaced head sections 11 with the intermediate strip portion 12 being bent to provide a dependent arm 35 having an outwardly inclined guide surface 37 merging into a pronounced cam shoulder 38. Preferably this dependent arm 35 is formed with a longitudinal corrugation which adds to the strength and rigidity thereof. The spring arm 36 is provided by a return bent portion adjoining the dependent arm 35 and extends substantially straight with the free end thereof bent to provide the tongue or hook element 20. The arrangement, accordingly, is such that the fastener is readily attached to the part D, Fig. 6, by passing the tongue or hook through an opening 7 in said part to a position in which said tongue or hook cooperates with the head sections 11 of the fastener to retain the same in attached position substantially as described with reference to Figs. 1-4 inclusive.

The snap stud defined by the arms 35—36 is then inserted into the opening 8 in part C and as the stud is pushed axially, the arms are compressed toward each other as necessary for the cam shoulder 38 on arm 35 to pass through the opening into positive abutting engagement with an adjoining marginal portion of said opening. Thus, the locking action of the stud is provided primarily by the pronounced cam shoulder 38 on the dependent arm 35 while the spring arm 36 serves, more particularly, as a pressure element exerting a constant outward spring force on said dependent arm 35 in a manner which insures a positive locking engagement of the cam shoulder 38 in the panel opening 8 at all times.

Fig. 7 shows another form of fastener 40 which is generally similar in construction, application and use to that disclosed in Figs. 1-4 inclusive. In this form of the invention, the tongue on the free end of the central strip 12 is so constructed as to define a rounded hook 41, or the like, corresponding substantially to the contour of a tube, rod, cable or other part T to be mounted on the supporting part E. The free end of the hook preferably terminates in an outwardly flared lip 42 which facilitates the application of the tube or other article into attached position between the hook and head sections 11 of the fastener. The fastener has the same general type of snap stud construction which is easily and quickly applied in a socket opening 9 in the supporting part E by a simple axial thrust-like motion. In the final position of the fastener, the hook 41 in engagement with the object secured, likewise supports and rigidifies the free end of the spring arm 16 to ensure the most effective fastening action of the snap stud in the socket opening 9, as in the previously described forms of the invention.

The fastener in any form preferably is constructed of relatively thin sheet metal the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap and highly effective fastener may be provided from cold rolled metal, such as cold rolled steel, which is untempered but of a spring metal nature and capable of providing an effective and reliable fastener.

While the invention has been described in detail with specific examples such examples are intended as illustrations only inasmuch as changes in the construction and arrangement of the clip or fastener within the broad scope of the instant disclosure are fully contemplated.

What is claimed is:

A fastener comprising a piece of sheet metal defining a body portion comprising a central head section and a pair of spaced side head sections extending in the same general direction, said head sections all lying in the same plane, a strip portion united to said central head section between said spaced side head sections and bent to provide a stud at one side of said body portion comprising an arm dependent from said central head section and a return bent spring arm extending through the space between said spaced side head sections and provided with a clip element at the opposite side of said body portion in spaced relation to the plane of said head sections and adapted to bear upon a part to be secured to clasp the same against said head sections.

GEORGE A. TINNERMAN.

REFERENCES CITED

The following references are of record in the file of this patent:

UNITED STATES PATENTS

| Number | Name | Date |
| --- | --- | --- |
| 2,108,347 | Quarnstrom | Feb. 15, 1938 |
| 2,144,171 | Van Uum | Jan. 17, 1939 |
| 2,537,662 | Flora et al. | Jan. 6, 1951 |